United States Patent
Miyaji

(10) Patent No.: US 9,952,249 B2
(45) Date of Patent: Apr. 24, 2018

(54) INERTIA ESTIMATING METHOD AND INERTIA ESTIMATION APPARATUS OF POSITION CONTROL APPARATUS

(71) Applicant: OKUMA Corporation, Niwa-gun, Aichi (JP)

(72) Inventor: Masashi Miyaji, Niwa-gun (JP)

(73) Assignee: OKUMA CORPORATION (JP)

( * ) Notice: Subject to any disclaimer, the term of this patent is extended or adjusted under 35 U.S.C. 154(b) by 976 days.

(21) Appl. No.: 14/262,371

(22) Filed: Apr. 25, 2014

(65) Prior Publication Data
US 2014/0318246 A1 Oct. 30, 2014

(30) Foreign Application Priority Data
Apr. 25, 2013 (JP) ................. 2013-092615

(51) Int. Cl.
*G01P 15/08* (2006.01)
*G01M 1/10* (2006.01)

(52) U.S. Cl.
CPC ........... *G01P 15/0802* (2013.01); *G01M 1/10* (2013.01)

(58) Field of Classification Search
CPC .................................................. G01P 15/0802
USPC .................................. 73/865, 865.3, 514.01
See application file for complete search history.

(56) References Cited

FOREIGN PATENT DOCUMENTS

| CN | 101733749 A | 6/2010 |
|----|-------------|--------|
| JP | H08140386 A | * 11/1994 |
| JP | 08140386 A | 5/1996 |
| JP | 2005172788 A | * 6/2005 |
| JP | 2005346359 A | 12/2005 |
| JP | 2008148402 A | 6/2008 |
| JP | 201011680 A | 1/2011 |

OTHER PUBLICATIONS

Chinese Office Action for Chinese Patent Application No. 201410170409.8, dated May 11, 2017. 8 Pages.

* cited by examiner

*Primary Examiner* — Hezron E Williams
*Assistant Examiner* — Tarun Sinha
(74) *Attorney, Agent, or Firm* — McCarter & English, LLP

(57) ABSTRACT

A torque command value and an acceleration detection value are accumulated when a driven portion is subjected to acceleration/deceleration driving, and, from a ratio between the two, inertia of a movable portion is calculated. By executing the acceleration/deceleration driving about a position where influence of gravity torque is zero, the influence of the gravity torque included in the torque command value before and after the center position is offset, whereby inertia can be estimated correctly even with a machine structure in which the influence of gravity differs depending on the position of the motor.

12 Claims, 12 Drawing Sheets

INERTIA ESTIMATING METHOD AND INERTIA ESTIMATION APPARATUS OF POSITION CONTROL APPARATUS

CROSS REFERENCE TO RELATED APPLICATIONS

This application claims priority under 35 U.S.C. § 119(a)-(d) to Japanese Patent Application No. 2013-092615, filed on Apr. 25, 2013, the content of which is incorporated herein by reference in its entirety as part of the present disclosure.

FIELD OF THE INVENTION

The present invention relates to a position control apparatus of a machine tool or the like. More particularly, the present invention relates to an improved inertia estimating method and an improved inertia estimating apparatus used at an axis on which gravity is exerted.

BACKGROUND OF THE INVENTION

To drive a feed axis of a machine tool or the like with a servo motor, a position and velocity control system is configured to control position and velocity of a load attached to a motor, based on a command from a numerical control apparatus. To control the position and velocity of the motor and the load correctly, it is necessary to determine control parameters based on inertia of the motor and the load. Since the inertia of the load is changed for each workpiece, various inertia estimating methods have been proposed.

FIG. 13 illustrates a technique disclosed in JP08-140386A. In this technique, a motor is driven at a constant velocity for a plurality of different velocities (Step 1), and, for each velocity, torque needed to cancel friction and torque needed to cancel gravity are measured (Steps 2 and 3). Subsequently, the servo motor is subjected to acceleration/deceleration driving (Step 4), whereby a relation between velocity and torque and a relation between velocity and acceleration are determined (Steps 5 to 7). From the relation between velocity and torque, torque needed to cancel a previously measured friction component and torque needed to cancel a gravity component are subtracted. After torque needed to accelerate inertia is calculated (Step 8), a calculation result is divided by the acceleration determined during acceleration/deceleration driving (Step 9).

FIG. 14 illustrates a technique disclosed in JP2005-172788A. In this technique, a position of a motor is unchanged for a plurality of measurements when information necessary for estimating inertia is acquired. Accordingly, inertia can be calculated even with a machine structure in which influence of gravity differs depending on the position of the motor.

FIG. 15 illustrates a control structure to estimate inertia in JP2005-172788A. A velocity controller 11 generates a torque command value Tc for a motor 12 according to an error between a velocity command value Vc and a velocity detection value Vd. Meanwhile, a motor model 15 is a mathematical expression of a relation between a torque command and a rotation velocity, and is expressed by a 1 mass system or a 2 mass resonant system. A velocity controller 14 has an internal structure equivalent to that of the velocity controller 11, and generates a torque command T'c and supplies it to a motor model 15. The motor model 15 generates a velocity detection value V'd to calculate an error between the velocity command value Vc and the velocity detection value V'd, and supplies the error as an input to the velocity controller 14.

It is assumed that the velocity command value Vc has a velocity waveform as described in Step 12 of FIG. 14, where the first operation is a reciprocal movement, and the second operation is a reverse-order reciprocal movement with a sign of the velocity being inverted. The first and second operations are executed at the same position by providing a process to move the position by θI. When the velocity command value Vc is given, the torque command values Tc and T'c are output respectively from the velocity controllers 11 and 14. Integrators 13 and 16 respectively integrate output values in an integration section in step 12 of FIG. 14. When the integration section is ended, inertia is calculated by the following formula (1). In formula (1), J represents an inertia estimating value and J' represents an assumed inertia value used in the motor model 15.

$$J = \{[\int(Tc)dt / \int(T'c)dt\} \times J' \quad (1)$$

In the technique of JP08-140386A, the torque needed to cancel a friction component and a gravity component is subtracted from the torque necessary for acceleration/deceleration driving. Accordingly, it is possible to calculate the inertia correctly, provided that the torque is fixed relative to the velocity. However, as it is necessary to drive the motor to different moving directions at different fixed rates in order to measure the torque required to cancel the friction component and the torque required to cancel the gravity component, estimating the inertia is time-consuming. Also, the torque needed to cancel the gravity component is assumed to be constant at any position of the motor, which causes a problem that it is not possible to accurately estimate inertia for a machine structure in which influence of gravity differs depending on the position of the motor, as shown in FIG. 16.

In FIG. 16, a table 23 having been firmly fixed to a motor 21 with an arm 22 is rotated about an axis of the motor. Assuming that a distance between the center of the axis of the motor and a position of the center of gravity of the table 23 is represented by L0, gravity exerted on the position of the center of gravity is represented by Fg, a force component perpendicular to the direction of the center of the axis of the motor about Fg is represented by Fr, torque needed to cancel a gravity component is represented by Tg, and a rotation angle of the motor 21 is represented by θ, Fr and Tg are then expressed by the following formulas (2) and (3).

$$Fr = Fg \times \sin\theta \quad (2)$$

$$Tg = Fr \times L0 = Fg \times L0 \times \sin\theta \quad (3)$$

Specifically, the torque Tg needed to cancel a gravity component is changed in a sinusoidal manner based on a rotation angle θ of the motor 21. Accordingly, inertia cannot be calculated correctly due to influence of changing torque, even when the motor is being driven at a constant velocity.

Meanwhile, in a technique disclosed in JP2005-172788A, the torque command values Tc and T'c are always accumulated in the same section, whereby the same torque Tg needed to cancel a gravity component can be provided in multiple measurements. The torque command value Tc to be accumulated, however, includes both torque needed to cancel a friction component and torque needed to cancel a gravity component. Therefore, there is a problem that an estimated value of inertia to be calculated would include an error corresponding to such torque.

SUMMARY OF THE INVENTION

A problem to be solved by the present invention is that inertia cannot be estimated correctly in a machine structure in which influence of gravity differs depending on the position of a motor. An object of the present invention is, therefore, to provide a method and an apparatus for estimating inertia in which inertia can be estimated correctly even with a machine structure in which influence of gravity differs depending on the position of a motor.

According to an embodiment of the present invention, an inertia estimating method is configured to estimate inertia of a movable portion including a motor and a driven portion mounted on an apparatus that drives the motor according to a torque command value. The torque command value is calculated based on a position command value and a position detection value of the motor or the driven portion connected to the motor. The method includes determining, when the movable portion is driven, an acceleration/deceleration condition to determine at least one of an acceleration driving condition and a deceleration driving condition, such that a cumulative value of gravity torque or acceleration of the movable portion has a symmetric characteristic about a position where the gravity torque that cancels the influence of gravity is zero. The method also includes calculating inertia to calculate inertia of the movable portion from a ratio between a cumulative value of the torque command value obtained when the motor is driven according to the determined acceleration or deceleration condition and a cumulative value of an acceleration detection value of the motor or the driven portion.

In a preferred embodiment, the position where the gravity torque is zero is identified from the position detection value obtained at timing when the polarity of the torque command value is inverted when the driven portion is driven at a constant velocity. In another preferred embodiment, when the driven portion is subjected to acceleration driving or deceleration driving, acceleration time or deceleration time is adjusted in such a manner that the cumulative value of the gravity torque is the same before and after passing the position where the gravity torque is zero.

In another preferred embodiment, the step of determining an acceleration/deceleration condition includes monitoring the torque command value when the driven portion is reciprocally driven at a constant velocity. The position where the gravity torque is zero is identified from a middle point between the position detection value obtained at timing when the polarity of the torque command value is inverted in a going path and the position detection value obtained at timing when the polarity of the torque command value is inverted in a returning path.

In another preferred embodiment, the step of determining an acceleration/deceleration condition includes determining both the acceleration driving condition and the deceleration driving condition such that the magnitude of the cumulative value of the gravity torque or the acceleration is changed in line symmetry about the position where the gravity torque is zero. The step of calculating inertia includes monitoring the torque command value and the acceleration detection value when the motor is driven according to the determined acceleration and deceleration conditions. The inertia of the movable portion is calculated from an average value of a ratio between the cumulative value of the torque command value and the cumulative value of the acceleration detection value during the acceleration driving, and a ratio between the cumulative value of the torque command value and the cumulative value of the acceleration detection value during the deceleration driving.

In another preferred embodiment, the step of determining an acceleration/deceleration condition includes determining both an acceleration driving condition and a deceleration driving condition such that the magnitude of the cumulative value of the gravity torque or the acceleration is changed in line symmetry about the position where the gravity torque is zero. The step of calculating inertia includes monitoring the torque command value and the acceleration detection value when the motor is driven according to the determined acceleration condition and deceleration conditions. The inertia of the movable portion is calculated from a ratio between an added value obtained by adding up the cumulative value of the torque command value during the acceleration driving and the deceleration driving, respectively, and an added value obtained by adding up the cumulative value of the acceleration detection value during the acceleration driving and the deceleration driving, respectively.

According to another embodiment of the present invention, an inertia estimating apparatus is configured to estimate inertia of a movable portion including a motor and a driven portion mounted on an apparatus that drives the motor according to a torque command value. The torque command value is calculated based on a position command value and a position detection value of the motor or the driven portion connected to the motor. The apparatus includes an acceleration/deceleration condition determining unit configured to determine, when the movable portion is driven, at least one of an acceleration driving condition and a deceleration driving condition, such that a cumulative value of gravity torque or acceleration of the movable portion has a symmetric characteristic about a position where the gravity torque that cancels influence of gravity is zero. The apparatus also includes an inertia calculating unit configured to calculate inertia of the movable portion from a ratio between the cumulative value of the torque command value obtained when the motor is driven according to the determined acceleration or deceleration condition, and a cumulative value of an acceleration detection value of the motor or the driven portion. The inertia is calculated after the gravity torque included in the torque command value is offset before and after the position where the gravity torque is zero.

With the present invention, the driven portion is subjected to acceleration/deceleration driving to offset the influence of the gravity torque in the course of accumulating the torque command value for estimating inertia, whereby the inertia can be estimated correctly even with the machine structure in which the influence of gravity differs depending on the position of the motor.

DETAILED DESCRIPTION OF THE EMBODIMENTS OF THE INVENTION

Figure 1:
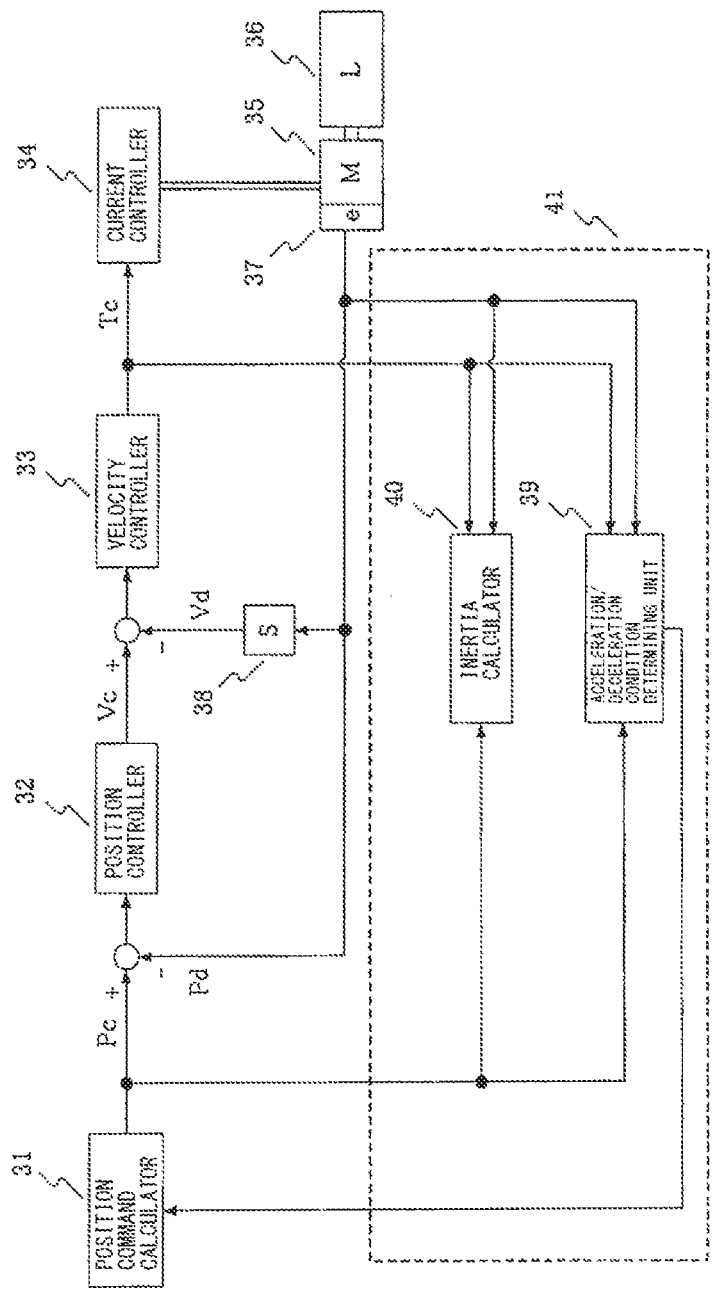
FIG. 1 is a block diagram illustrating an embodiment of the present invention.

An embodiment of the present invention will be described below. Constituent components similar to those illustrated in the conventional example are denoted by the same reference numerals, and descriptions thereof are not repeated.

FIG. 1 is a block diagram illustrating an embodiment of the present invention. A position command calculator 31 generates a position command value Pc, and a position detector 37 detects a position detection value Pd of a motor 35 or a load 36. A deviation between Pc and Pd is input to a position controller 32 which generates a velocity command value Vc as an output. Meanwhile, a differentiator 38 differentiates the position detection value Pd to generate a velocity detection value Vd as an output. A deviation between the velocity command value Vc and the velocity detection value Vd is input to a velocity controller 33 which generates a torque command value Tc as an output. A current controller 34 drives the motor 35 with the load 36 attached thereto according to the torque command value Tc.

In FIG. 1, a position control apparatus further includes an inertia estimating unit 41 which allows estimation of inertia of the movable portion. The inertia estimating unit 41 includes an acceleration/deceleration condition determining unit 39 that determines an acceleration/deceleration condition for calculating inertia of a movable portion, and an inertia calculator 40 that calculates inertia of the movable portion.

Figure 6:
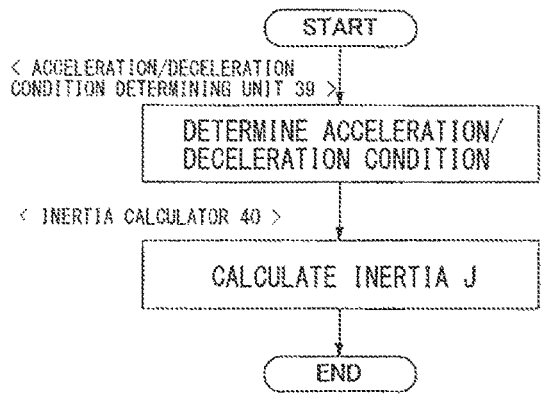
FIG. 6 is a flowchart illustrating a processing procedure of the present invention.

FIG. 6 is a flowchart illustrating a processing procedure of the present invention. After the acceleration/deceleration condition for calculating inertia of the movable portion is determined by the acceleration/deceleration condition determining unit 39, the inertia of the movable portion is calculated by the inertia calculator 40. The acceleration/deceleration condition determining unit 39 and the inertia calculator 40, as well as each processing procedure, will be described in embodiments with reference to flowcharts shown in FIGS. 7 to 12.

First, referring to FIG. 2, an operation of the acceleration/deceleration condition determining unit 39 will be described. In the case of a machine structure in which influence of gravity differs depending on the position of the motor, torque (gravity torque) Tg needed to cancel a gravity component is changed in response to a rotation angle θ, as shown in the uppermost row of FIG. 2.

Figure 2:
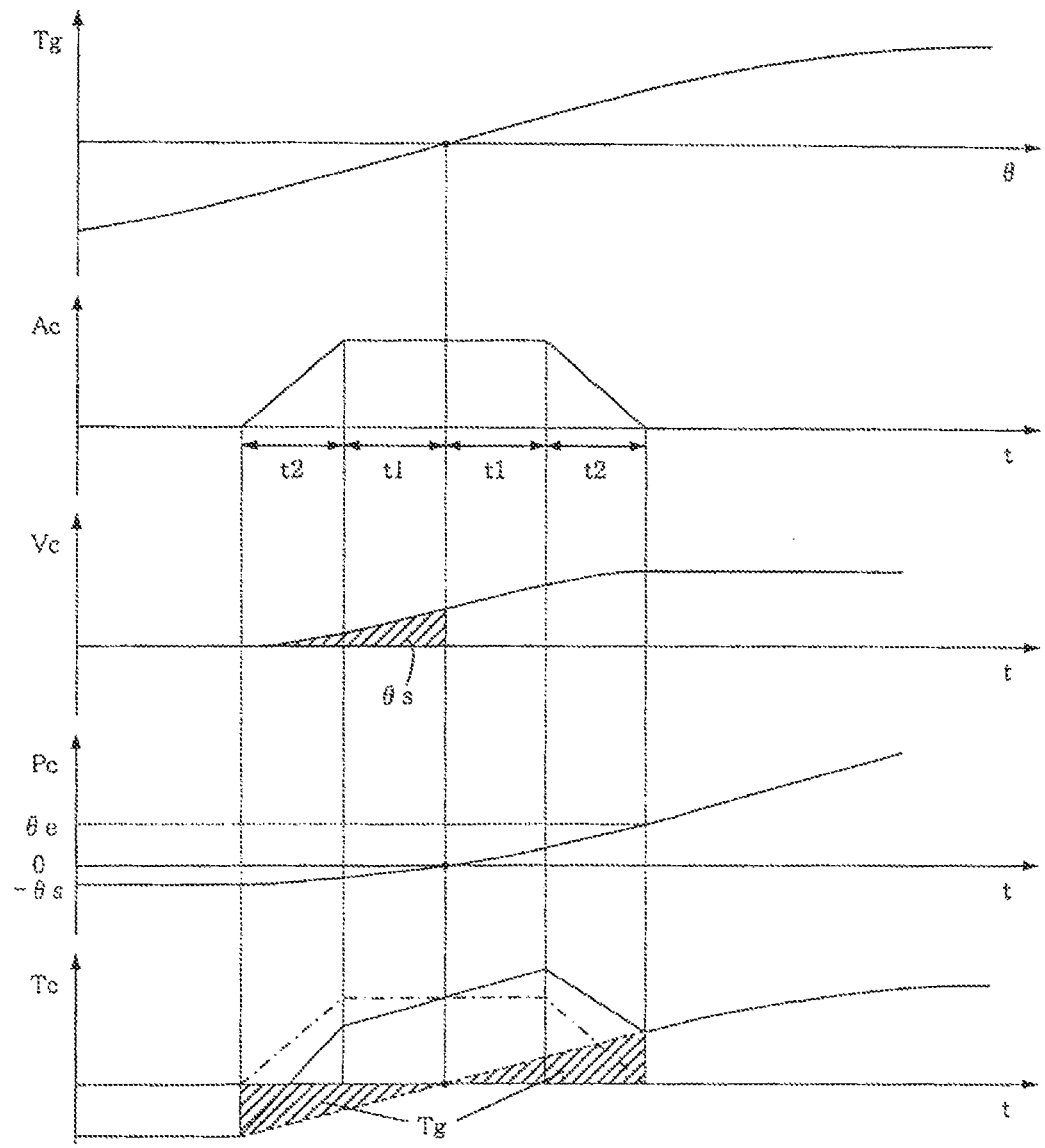
FIG. 2 is a characteristic diagram of a position command and a torque command in an application of the present invention.

At this time, the acceleration/deceleration condition determining unit 39 determines an acceleration command value Ac, as shown in the second row from the top in FIG. 2. Specifically, the acceleration command is configured such that the acceleration of a driven portion, such as the motor 35 and the load 36, changes in line symmetry about a position where Tg is zero. For example, as shown in FIG. 2, the acceleration is increased from zero during t2 to a constant acceleration at which the driven portion is driven during t1 to reach a position where Tg is zero. Driving at the constant acceleration continues during t1, and then the acceleration is decreased to zero during t2 where the acceleration is ended. It is assumed that a position where Tg is zero can be determined in advance based on a machine structure, etc.

The acceleration command value Ac determined above is integrated to obtain a velocity command value Vc as shown in the third row from the top of FIG. 2. By integrating the velocity command value Vc, a position command value Pc as shown in the fourth row from the top of FIG. 2 can be obtained.

With the origin being at the position where Tg is zero, the position command value Pc is configured such that the start point of acceleration is a position advanced from the origin 0 by θs. The magnitude of θs can be determined by integrating the velocity command value Vc from the start point of acceleration to the position where Tg is 0.

The acceleration/deceleration condition determining unit 39 notifies the position command calculator 31 of the acceleration/deceleration conditions such as the start point of acceleration −θs and the acceleration/deceleration time t1, t2, etc., such that the position command value Pc is output from the position command calculator 31.

When the position command value Pc as shown in the fourth row from the top of FIG. 2 is output from the position command calculator 31, the motor 35 is driven via the position controller 32, the velocity controller 33, and the current controller 34.

At this time, the torque command value Tc output from the velocity controller 33 is changed as shown in the bottom row of FIG. 2. Under the condition that there is no influence of gravity, the torque command value Tc is proportional to the acceleration command value Ac, as shown by a dash-and-dot line in the bottom row of FIG. 2. When the influence of gravity exists, however, the torque command value Tc would have a characteristic as shown by a solid line in the bottom row of FIG. 2, as the torque command value includes an acceleration torque needed to accelerate the driven portion and torque needed to cancel a gravity component.

Torque indicated by hatching at the bottom of FIG. 2 is equivalent to the torque Tg needed to cancel a gravity component, in which the torque equivalent to Tg becomes zero at timing when the origin 0 is passed.

Next, the operation of the inertia calculator 40 is described. The inertia calculator 40 determines an acceleration/deceleration state from the position command value Pc, and accumulates the torque command value Tc and the acceleration detection value Ad obtained by second-order differential of the position detection value Pd when it is in the acceleration/deceleration state. The acceleration detection value Ad may be obtained by providing an acceleration sensor in the motor or the driven portion. After the acceleration/deceleration, a cumulative value of the torque command value Tc is divided by the cumulative value of the acceleration detection value Ad to provide a calculation result representing inertia of the movable portion.

The accumulated torque command value Tc includes the torque Tg needed to cancel a gravity component, but the sign of Tg is inverted when the origin 0 is passed, as shown by hatching at the bottom of FIG. 2. Therefore, when the torque command value Tc is accumulated during acceleration, the torque Tg needed to cancel a gravity component is offset before and after the origin 0 is passed, whereby the cumulative value of the torque command value Tc becomes approximately equal to the cumulative value of the acceleration torque needed to accelerate the driven portion. Accordingly, the inertia of the movable portion with influence of gravity being eliminated can be calculated, as the cumulative value of the acceleration torque needed for acceleration is divided by the cumulative value of the acceleration detection value Ad.

In the above embodiment, the acceleration operation has been described by referring to the example shown in FIG. 2, but the calculation of inertia is not limited thereto. For example, FIG. 2 illustrates the acceleration operation from the position −θs to the position θe, but it may be possible to reverse the direction of operation by, for example, accelerating from the position θs to the position −θe. Alternatively, it may also be possible to replace the acceleration operation by the deceleration operation to calculate inertia by, for example, decelerating from the position θe to the position −θs, or from the position −θe to the position θs.

Figure 7:
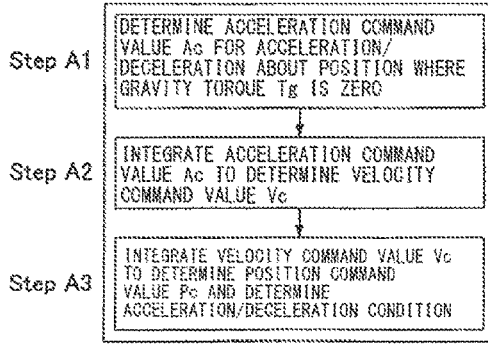
FIG. 7 is a flowchart illustrating a processing procedure according to an embodiment of the present invention.
Figure 7:
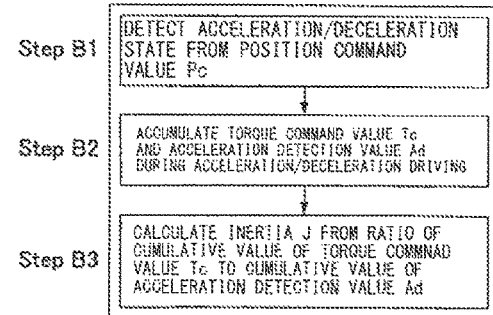

FIG. 7 is a flowchart that summarizes the processing procedure of the acceleration/deceleration condition determining unit 39 and the inertia calculator 40.

First, in (Step A1), the acceleration/deceleration condition determining unit 39 determines the acceleration command value Ac for acceleration/deceleration about the position where Tg is zero. In (Step A2), the velocity command value Vc is determined by integrating the acceleration command value Ac. Further, in (Step A3), the position command value Pc is determined by integrating the velocity command value Vc, whereby the acceleration/deceleration condition to be used in the position command calculator 31 is determined. Accordingly, the motor 35 is driven according to the acceleration/deceleration condition determined in (Step A3).

Meanwhile, the acceleration/deceleration state is detected from the position command value Pc in (Step B1), and the torque command value Tc and the acceleration detection value Ad during the acceleration/deceleration are accumulated in (Step B2). After the acceleration/deceleration, in (Step B3), the cumulative value of the torque command value Tc is divided by the cumulative value of the acceleration detection value Ad to calculate an inertia J of the movable portion.

Thus, in the inertia estimating method of the present invention, the driven portion is subjected to acceleration/deceleration driving to offset the influence of the gravity torque in the course of accumulating the torque command value to estimate inertia, whereby the inertia can be estimated correctly even with a machine structure in which the influence of gravity differs depending on the position of the motor.

Next, a modified embodiment of the first embodiment is described. In the embodiment described below, the function of the acceleration/deceleration condition determining unit 39 is expanded as compared to the first embodiment.

In the first embodiment, the position where the torque Tg needed to cancel a gravity component is zero can be determined in advance based on the machine structure, etc. If, however, the position of the center of gravity is deviated, such as by placing a workpiece 24 on a table 23 in an imbalanced manner, as shown in FIG. 3, the position where the torque Tg needed to cancel a gravity component is zero would also be deviated.

Figure 3:
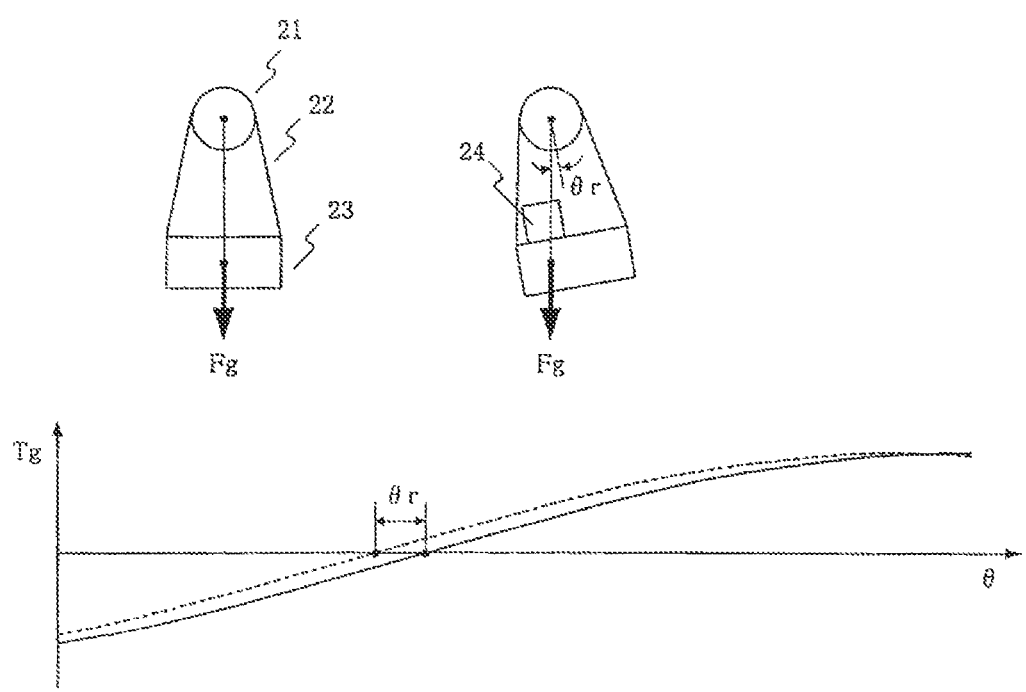
FIG. 3 is a characteristic diagram of gravity torque when a position of the center of gravity of a driven portion is deviated.

For example, when no workpiece 24 is placed, it is assumed that the characteristic of the torque Tg needed to cancel a gravity component is indicated by a dotted line in the lower part of FIG. 3, and that a machine attitude that is to be balanced when the workpiece 24 is placed is at a position deviated by θr of a rotation angle of the motor 21. Accordingly, the characteristic of Tg would be indicated by a solid line in the lower part of FIG. 3, where the magnitude of Tg is zero at a position deviated by θr relative to the state where no workpiece 24 is placed.

With such a deviation included, it is not possible to offset the influence of the gravity torque in the course of accumulating the torque command value for estimating inertia as in the first embodiment. That is, the deviation has to be corrected to estimate inertia correctly. In this embodiment, therefore, the following function is added to the acceleration/deceleration condition determining unit 39 of the first embodiment.

The magnitude of torque Tg needed to cancel a gravity component relative to the rotation angle θ of the motor 21 is approximately equal to the torque command value Tc when the motor is driven at a constant velocity, and can be determined by measuring Tc relative to the rotation angle θ. Therefore, the acceleration/deceleration condition determining unit 39 is made to monitor Tc when the motor is driven at a constant velocity, and, based on the position detection value Pd when Tc is zero, identifies a position where Tg is zero.

In this state, the position command value Pc is configured, as in the first embodiment, to calculate inertia by the inertia calculator 40. Thus, the inertia of the movable portion can be calculated with the influence of gravity being eliminated.

Figure 8:
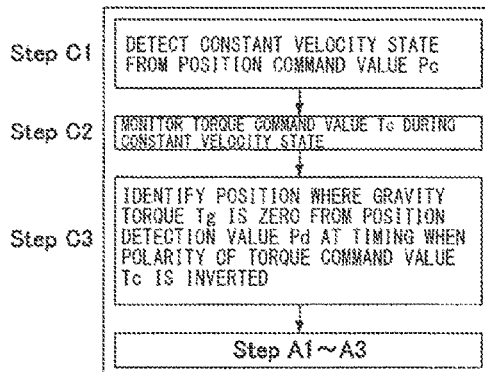
FIG. 8 is a flowchart illustrating a processing procedure according to an embodiment of the present invention.

FIG. 8 is a flowchart that summarizes a processing procedure of the acceleration/deceleration condition determining unit 39.

First, it is detected that the motor is driven at a constant velocity in (Step C1), and the torque command value Tc during the constant velocity driving is measured and monitored in (Step C2). In (Step C3), a position where Tg is zero is identified based on the position detection value Pd when the polarity of the torque command value Tc is inverted (i.e., Tc is zero). After that, (Step A1) to (Step A3) are executed to determine an acceleration/deceleration condition to be used in the position command calculator 31.

As described above, in the inertia estimating method of the present invention, even when the position of the center of gravity of the driven portion is deviated, by measurement the position where Tg is zero. The driven portion is subjected to acceleration/deceleration driving to offset the influence of the gravity torque in the course of accumulating the torque command value, whereby the inertia can be estimated correctly even with a machine structure in which the influence of gravity differs depending on the position of the motor.

Next, another modified embodiment of the first embodiment is described. In the embodiment described below, the function of the acceleration/deceleration condition determining unit 39 is expanded as compared to the first embodiment.

In the first embodiment, it has been described that the command is configured to accelerate the driven portion, such as the motor 35 or the load 36, about the position where the torque Tg needed to cancel a gravity component is zero, to thereby accelerate from the position −θs to the position θe. However, as the velocity is gradually increased during acceleration, a movement amount for the same time period is increased over time.

Figure 4:
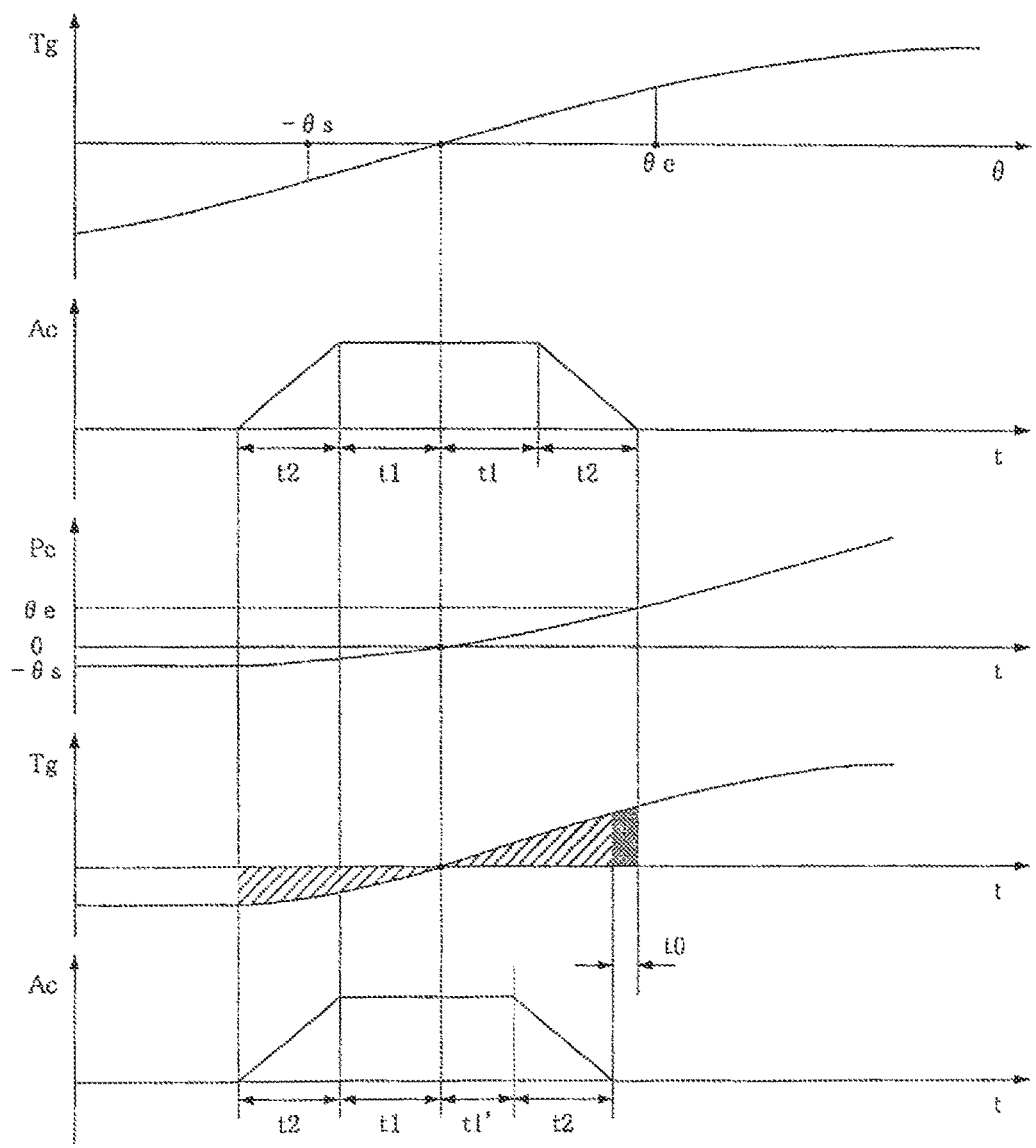
FIG. 4 illustrates a method of adjusting acceleration/deceleration time in the present invention.

That is, as shown in FIG. 4, a magnitude relation between the start point of acceleration −θs and the end point of acceleration θe is θs<θe, and the magnitude of the torque Tg needed to cancel a gravity component is expressed by |Tg(−θs)|<|Tg(θe)|. Accordingly, it is not possible to completely offset the influence of gravity before and after the position where Tg is zero, and a resultant estimation of inertia includes a slight influence of the gravity torque. Therefore, in this embodiment, in contrast to the first embodiment, the following function is added to the acceleration/deceleration condition determining unit 39.

As in the first embodiment, after the position command value Pc is configured, the characteristic of Tg relative to a lapse of time t is calculated, as shown in the fourth row from the top of FIG. 4, based on the characteristic of the torque Tg needed to cancel a gravity component relative to the rotation angle θ of the motor 21.

Subsequently, there is determined the time when the same magnitude of the cumulative value of Tg is provided before and after passing the position where the torque Tg needed to cancel a gravity component is zero (the origin 0) (i.e., time when the cumulative value is returned to zero by starting accumulation of Tg at the start point of acceleration).

Accordingly, as shown in the bottom row of FIG. 4, the acceleration command value Ac with a shortened acceleration time is determined so that the acceleration is ended at the above time. In FIG. 4, a shortening time t0 is determined, and the time t1 during which a constant acceleration is provided is shortened and replaced by t1'. Such an acceleration command value Ac can be regarded as a command to provide a symmetric characteristic for the cumulative value of the gravity torque Tg about the position where Tg is zero.

Thus, the acceleration command value Ac with the adjusted acceleration/deceleration time is subjected to second-order integration to reconstitute the position command value Pc. Based on the reconstituted position command value Pc, the acceleration/deceleration driving is executed to calculate inertia by the inertia calculator 40 as in the first embodiment.

By the operation described above, the torque Tg needed to cancel a gravity component before and after the origin 0 is passed can be offset more accurately, leading to the estimation of inertia of the movable portion with the influence of gravity being eliminated.

Figure 9:
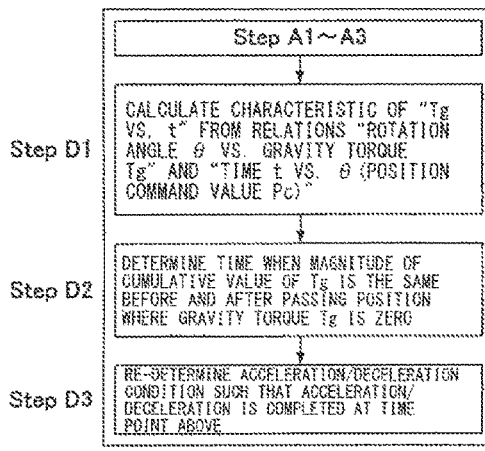
FIG. 9 is a flowchart illustrating a processing procedure according to an embodiment of the present invention.

FIG. 9 is a flowchart that summarizes a processing procedure of the acceleration/deceleration condition determining unit 39.

First, the position command value Pc is determined by executing (Step A1) to (Step A3). In (Step D1), there is determined a characteristic of Tg relative to the time t. Further, in (Step D2), time when the magnitude of the cumulative value of Tg is the same before and after passing the position where the torque Tg is zero. In (Step D3), the acceleration/deceleration condition to be used in the position command calculator 31 is determined again such that the acceleration/deceleration based on the position command value Pc is ended at this time.

As described above, in the inertia estimating method of the present invention, the acceleration/deceleration time is adjusted to offset the influence of the gravity torque more accurately, whereby the inertia can be estimated more correctly even with a machine structure in which the influence of gravity differs depending on the position of the motor.

Next, a modified embodiment of the second embodiment is described. In the embodiment described below, the function of the acceleration/deceleration condition determining unit 39 is expanded as compared to the second embodiment.

Figure 5:
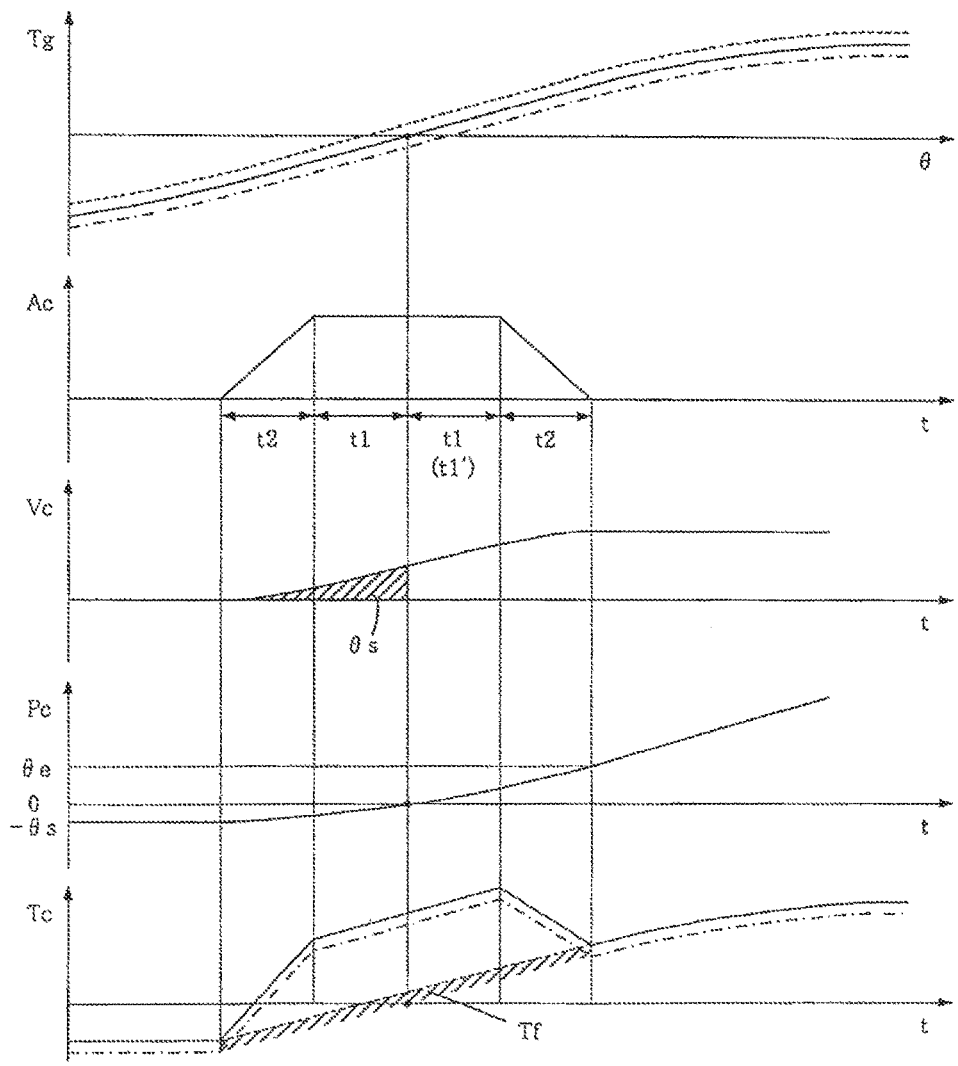
FIG. 5 is a characteristic diagram of a position command and a torque command in an application of the present invention.

When the magnitude of the torque Tg needed to cancel a gravity component is determined by measuring the torque command value Tc during the constant velocity driving, a waveform such as the one shown in the uppermost row of FIG. 5 is formed, so long as the influence of a friction torque is included in Tc. Specifically, in relation to a true value of Tg indicated by a solid line, a measurement result indicated by a dotted line is obtained when the motor 21 is rotated in a positive direction, and a measurement result indicated by a dash-and-dot line is obtained when the motor 21 is rotated in a negative direction.

That is, the position where the torque Tg needed to cancel a gravity component is zero would be deviated from the true value. This is because of the influence of the friction torque having different reacting directions depending on the moving direction.

With such a deviation included, it is not possible to cancel the influence of the gravity torque in the course of accumulating the torque command value for estimating inertia. That is, to estimate the inertia correctly, such a deviation has to be corrected. In this embodiment, therefore, the following function is added to the acceleration/deceleration condition determining unit 39 of the second embodiment.

To measure the magnitude of the torque Tg needed to cancel a gravity component relative to a rotation angle θ of the motor 21, the torque command value Tc relative to a rotation angle θ is measured when the motor is driven at a constant velocity in a positive direction and in a negative direction, respectively. In each case, the position detection value Pd where Tc is zero is identified, and the middle point thereof is regarded as a position where Tg is zero.

Subsequently, the position command value Pc is configured similarly to the second embodiment, and the inertia is calculated by the inertia calculator 40. Thus, the inertia of the movable portion can be calculated with the influence of gravity being eliminated.

Figure 10:
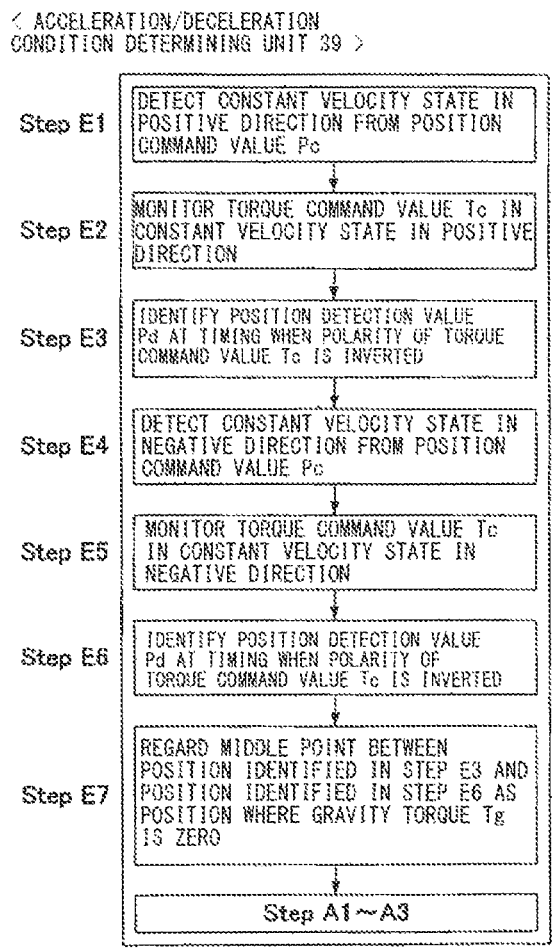
FIG. 10 is a flowchart illustrating a processing procedure according to an embodiment of the present invention.

FIG. 10 is a flowchart that summarizes a processing procedure of the acceleration/deceleration condition determining unit 39.

First, a state where the motor is driven at a constant velocity in a positive direction is detected in (Step E1), and the torque command value Tc is measured and monitored at the time of the constant-velocity driving in a positive direction (Step E2). In (Step E3), the position detection value Pd is identified when the polarity of the torque command value Tc is inverted (Tc is zero).

Subsequently, a state where the motor is driven at a constant velocity in a negative direction is detected in (Step E4), and the torque command value Tc is measured and monitored at the time of the constant-velocity driving in a negative direction (Step E5). In (Step E6), the position detection value Pd is identified when the polarity of the torque command value Tc is inverted (Tc is zero).

Subsequently, in (Step E7), a middle point between the position (Pd) identified in (Step E3) and the position (Pd) identified in (Step E6) is determined to be a position where Tg is zero. In this state, (Step A1) to (Step A3) are executed to determine the acceleration/deceleration condition to be used in the position command calculator 31.

(Step E1) to (Step E3) may be exchanged with (Step E4) to (Step E6). That is, no problem arises if (Step E1) to (Step E3) are executed after (Step E4) to (Step E6) have been executed.

Thus, in the inertia estimating method of the present invention, even when a large influence of friction torque exists, the position where the influence of gravity torque is zero is identified, whereby the driven portion is subjected to acceleration/deceleration driving so as to offset the influence of gravity torque in the course of accumulating the torque command value. Accordingly, inertia can be estimated correctly even with a machine structure in which the influence of gravity differs depending on the position of the motor.

Next, a modified embodiment of the fourth embodiment is described. In the embodiment described below, the function of the inertia calculator 40 is expanded as compared to the fourth embodiment.

When the influence of the friction torque included in the torque command value Tc is so strong that it cannot be ignored relative to the acceleration torque necessary for the acceleration/deceleration, an error would exist in the estimation value of inertia due to the influence of the friction torque in calculating inertia by accumulating Tc. In this embodiment, therefore, the following function is added to the inertia calculator 40 of the fourth embodiment.

Under the condition where the influence of the friction torque cannot be ignored, the torque command value Tc includes, as shown in the bottom row of FIG. 5, the acceleration/deceleration torque Ta, the torque Tg needed to cancel a gravity component, and torque Tf needed to cancel a friction component. In the bottom row of FIG. 5, a dash-and-dot line represents Tc with Ta and Tg having been considered, and a solid line represents Tc with Tf having been considered in addition to Ta and Tg. With respect to the characteristic represented by the solid line, torque equivalent to Tf, which is shown by hatching, is necessary to drive an axis. Relations with torque can be summarized using the rotation angle θ of the motor 21 by the following formula (4):

$Tc = Ta + Tg(\theta) + Tf$ [in acceleration (moving in positive direction)]

$-Ta + Tg(\theta) + Tf$ [in deceleration (moving in positive direction)]

$-Ta + Tg(\theta) - Tf$ [in acceleration (moving in negative direction)]

$Ta + Tg(\theta) - Tf$ [in deceleration (moving in negative direction)]     (4)

A sign of the acceleration/deceleration torque Ta is inverted and different between acceleration and deceleration. A direction of acceleration is also inverted and different between moving in a positive direction and moving in a negative direction. Meanwhile, as the torque Tg needed to cancel a gravity component is determined by position, the torque Tg is changed by neither acceleration/deceleration nor by the moving direction, so long as the position thereof is the same and the sign is also the same. Since the torque Tf needed to cancel a friction component acts against the axial movement, its sign is determined according to the moving direction.

The influence of friction torque can be offset by executing the acceleration operation and the deceleration operation at the same position. For example, by taking a difference between acceleration (moving in the positive direction) and deceleration (moving in the negative direction), the torque Tf needed to cancel a friction component included in the torque command value Tc or the cumulative value thereof can be offset.

Similarly, the torque Tf needed to cancel a friction component can also be offset by an addition between acceleration (moving in the positive direction) and deceleration (moving in the negative direction), a subtraction between acceleration (moving in the negative direction) and deceleration (moving in the negative direction), and an addition between acceleration (moving in the negative direction) and deceleration (moving in the positive direction).

However, in combinations of acceleration (moving in the positive direction) and deceleration (moving in the positive direction), and acceleration (moving in the negative direction) and deceleration (moving in the negative direction), there would be a difference in moving amount for the same period of time, even when the acceleration/deceleration section is the same, because of a different passing velocity at the same point. Accordingly, the position where the torque Tg needed to cancel a gravity component is zero and the manner in which Tg is changed would be different. Thus, the influence of the gravity torque remains to some extent when the inertia is calculated. Preferably, therefore, it is recommended to offset the torque Tf needed to cancel a friction component by using the combinations of acceleration (moving in the positive direction) and deceleration (moving in the negative direction), and acceleration (moving in the negative direction) and deceleration (moving in the positive direction).

To offset the torque Tf needed to cancel a friction component, the position control apparatus executes acceleration and deceleration operations about the position where the torque Tg determined by the acceleration/deceleration condition determining unit 39 to be needed to cancel a gravity component is zero. The inertia calculator 40 accumulates the torque command value Tc and the acceleration detection value Ad for the acceleration and deceleration operations, respectively.

After the acceleration and deceleration operations, a cumulative value of the torque command value Tc is divided by a cumulative value of the acceleration detection value Ad for the acceleration and deceleration operations, respectively, and whereby, from an average value of the two, inertia of the movable portion is calculated. In this case, the inertia of the movable portion calculated from the acceleration operation is increased by the influence of the friction torque, and the inertia of the movable portion calculated from the deceleration operation is decreased by the influence of the friction torque. By taking an average value of the two, inertia of the movable portion with the influence of the friction torque having been offset can be calculated.

Alternatively, a cumulative value of the torque command value Tc and a cumulative value of the acceleration detection value Ad, respectively, may be added up for the acceleration and deceleration operations to calculate an added cumulative value of the torque command and an added cumulative value of the acceleration detection. The added cumulative value of the torque command is divided by the added cumulative value of the acceleration detection to calculate inertia of the movable portion. In this case, in the course of calculating the added cumulative value of the torque command, it is possible to offset a friction torque component included in the cumulative value of the torque command value Tc during the acceleration operation and the deceleration operation, respectively.

Figure 11:
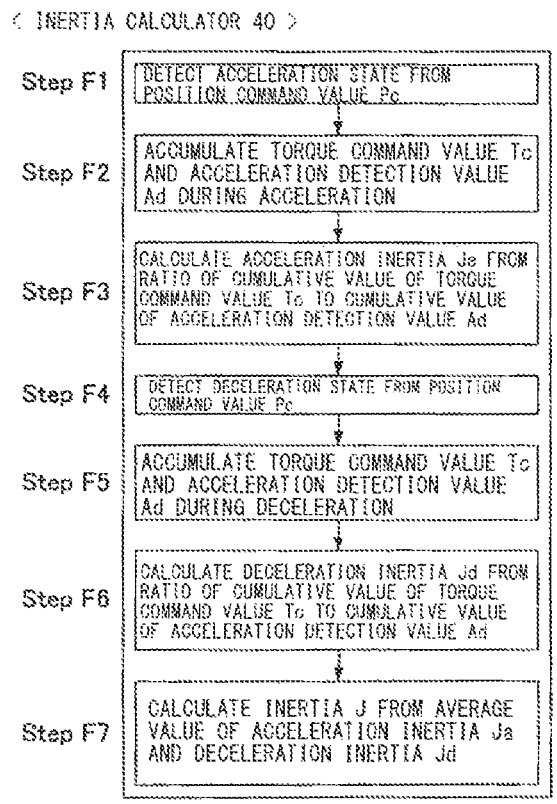
FIG. 11 is a flowchart illustrating a processing procedure according to an embodiment of the present invention.
Figure 12:
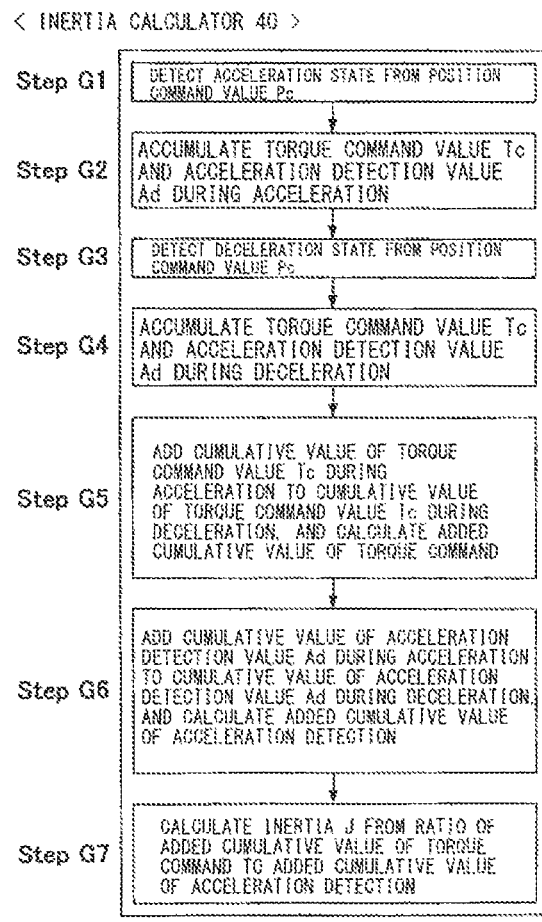
FIG. 12 is a flowchart illustrating a processing procedure according to an embodiment of the present invention.
Figure 13:
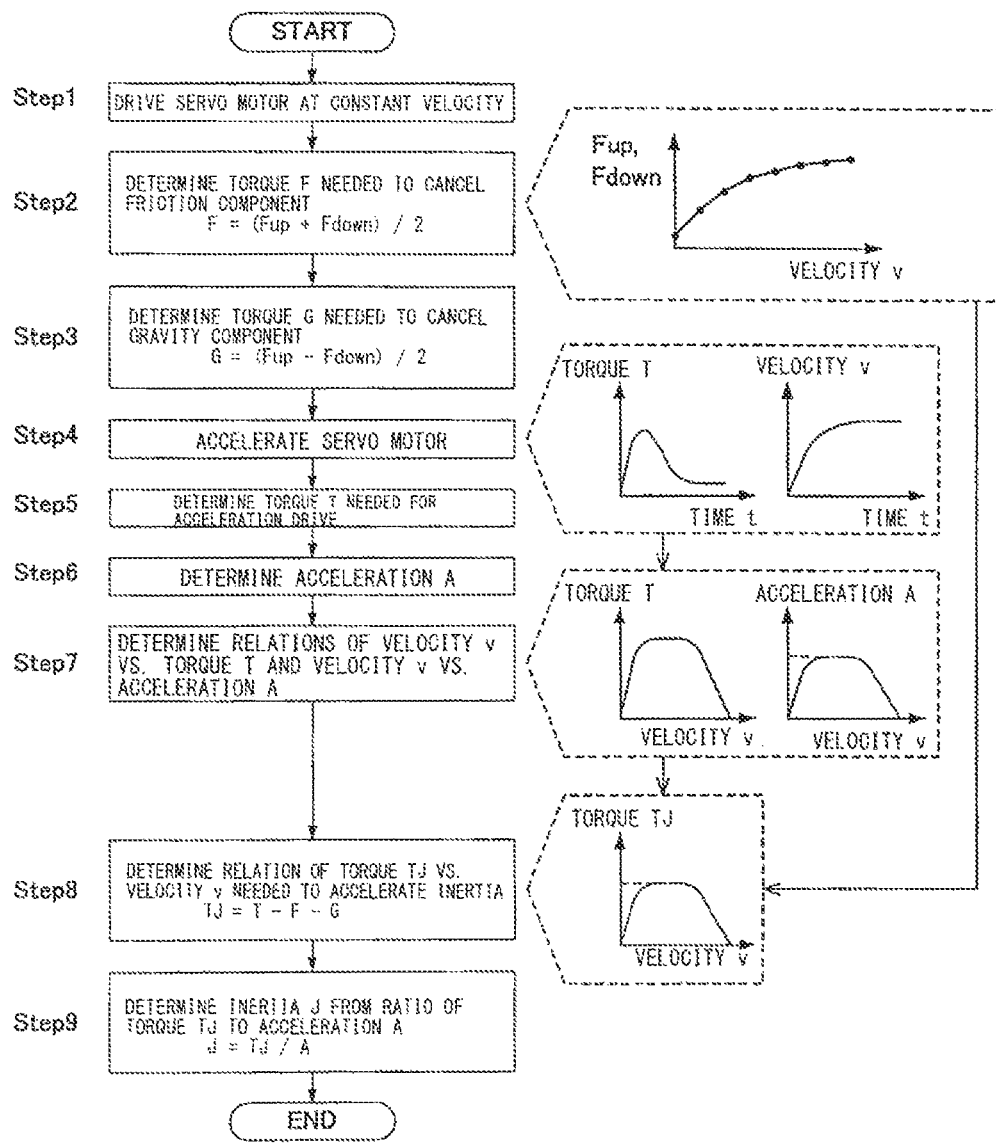
FIG. 13 is a flowchart illustrating a processing procedure of a previously-known technique.
Figure 14:
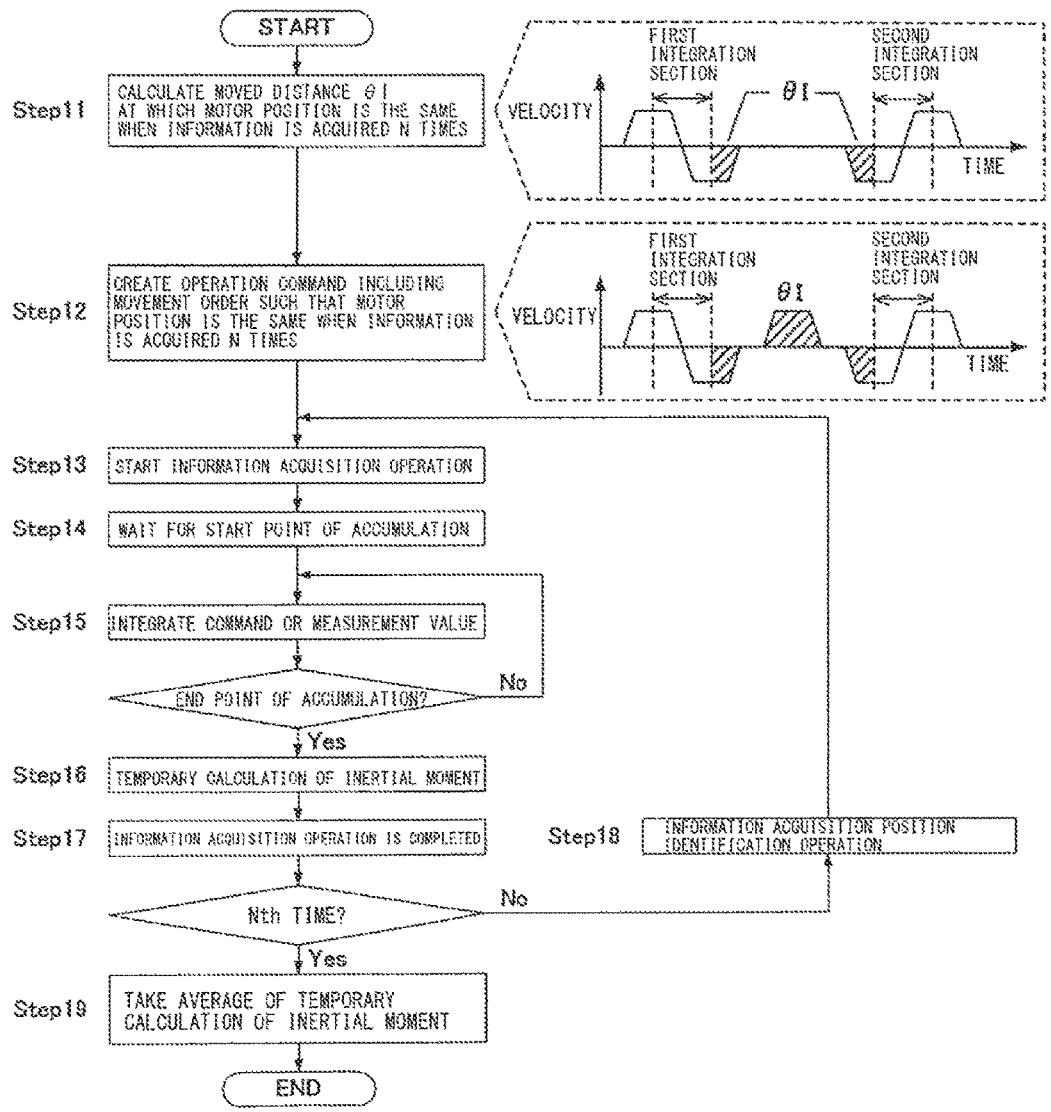
FIG. 14 is a flowchart illustrating a processing procedure of a previously-known technique.
Figure 15:
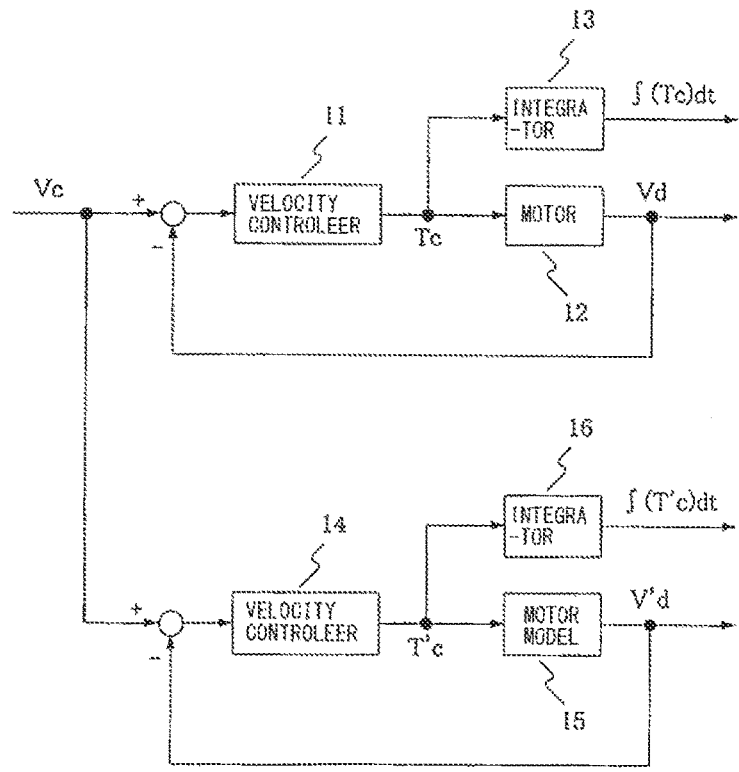
FIG. 15 is a block diagram illustrating a previously-known technique.
Figure 16:
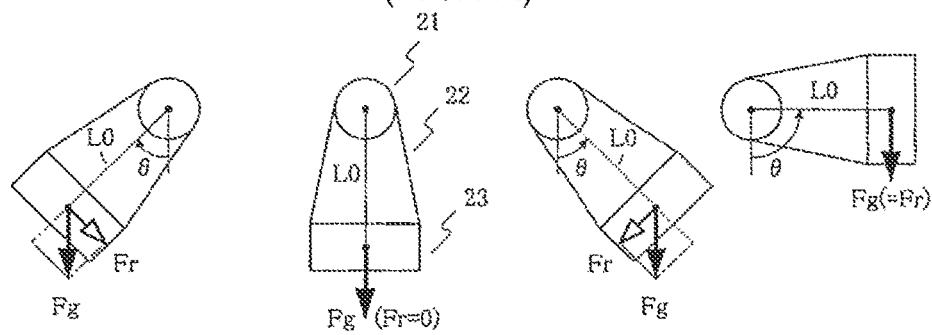
FIG. 16 illustrates changes of gravity torque depending on the position of a motor.
Figure 16:
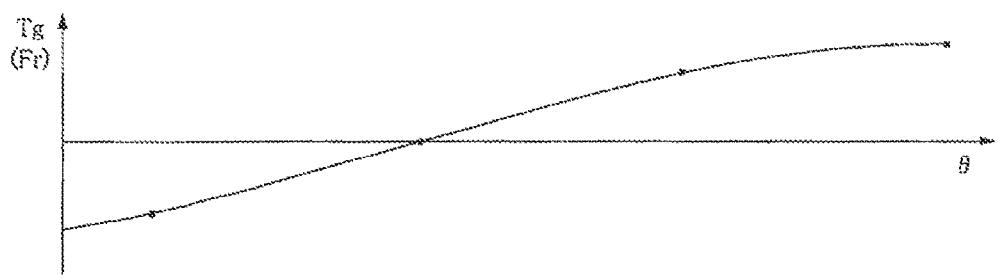

A processing procedure of the inertia calculator 40 of FIG. 6 can be summarized in a flowchart illustrated in FIG. 11 or FIG. 12.

First, in FIG. 11, the acceleration state is detected from the position command value Pc in (Step F1), and the torque command value Tc and the acceleration detection value Ad, respectively, are accumulated during acceleration in (Step F2). After the acceleration, the cumulative value of the torque command value Tc is divided by the cumulative value of the acceleration detection value Ad to calculate an acceleration inertia Ja in (Step F3).

Meanwhile, the deceleration state is detected from the position command value Pc in (Step F4), and the torque command value Tc and the acceleration detection value Ad, respectively, are accumulated during deceleration in (Step F5). After the deceleration, the cumulative value of the torque command value Tc is divided by the cumulative value of the acceleration detection value Ad to calculate a deceleration inertia Jd in (Step F6).

Subsequently, by taking an average of the acceleration inertia Ja and the deceleration inertia Jd in (Step F7), inertia J of the movable portion is calculated.

In FIG. 12, the acceleration state is detected from the position command value Pc in (Step G1), and the torque command value Tc and the acceleration detection value Ad are accumulated, respectively, during acceleration in (Step G2). After that, the deceleration state is detected from the position command value Pc in (Step G3), and the torque command value Tc and the acceleration detection value Ad are accumulated, respectively, during deceleration in (step G4).

Subsequently, the cumulative value of the torque command value Tc is added up during acceleration and deceleration, respectively, to calculate the added cumulative value of the torque command in (Step G5). The cumulative value of the acceleration detection value Ad is added up during acceleration and deceleration, respectively, to calculate the added cumulative value of the acceleration detection in (Step G6). In this state, the added cumulative value of the torque command is divided by the added cumulative value of the acceleration detection to calculate the inertia J of the movable portion.

As described above, in the inertia estimating method of the present invention, the influence of the gravity torque is offset in the course of accumulating the torque command value for estimating inertia, and the influence of the friction torque is offset by combining the acceleration and deceleration operations. Accordingly, inertia can be estimated correctly even with the machine structure in which the influence of gravity differs depending on the position of the motor and the influence of the friction torque cannot be ignored.

It is noted that the integrated torque command value Tc is used to calculate inertia in the first to fifth embodiments described above, but the present invention is not limited thereto. For example, the inertia may also be calculated by accumulating values such as a current command value converted from the torque command value Tc in the current controller 34 and a current detection value representing a detected current applied to the motor 35. A resultant accumulated value is multiplied by a torque constant or the like to convert it to a value equivalent to torque command value Tc.

What is claimed is:

1. An inertia estimating method for estimating an inertia of a movable portion including a motor and a driven portion connected to the motor and mounted on an apparatus that drives the motor according to a torque command value, the torque command value determined from a position command value and a position detection value of the motor or the driven portion connected to the motor, the method comprising the steps of:
    driving the movable portion;
    determining, when the movable portion is driven, an acceleration/deceleration condition to determine one or more of an acceleration driving condition or a deceleration driving condition, such that a cumulative value of a gravity torque or acceleration of the movable portion has a symmetric characteristic about a zero position where the gravity torque that cancels an influence of gravity is zero;
    calculating the position command value of the motor according to the acceleration driving condition or the deceleration driving condition determined in the step of determining the acceleration/deceleration condition;
    driving the motor based on the position command value calculated in the step of calculating the position command value, and obtaining the torque command value when the motor is driven and obtaining an acceleration detection value of the motor or the driven portion; and
    calculating the inertia of the movable portion using a ratio between a cumulative value of the torque command value and a cumulative value of the acceleration detection value of the motor or the driven portion.

2. The inertia estimating method according to claim 1, including determining the zero position using the position detection value obtained when a polarity of the torque command value is inverted when the driven portion is driven at a constant velocity.

3. The inertia estimating method according to claim 1, wherein,
    when the driven portion is subjected to acceleration driving or deceleration driving, adjusting an acceleration time or a deceleration time so that the cumulative value of the gravity torque is the same before and after passing the zero position.

4. The inertia estimating method according to claim 1, wherein
    the step of determining the acceleration/deceleration condition includes monitoring the torque command value when the driven portion is reciprocally driven at a constant velocity, and
    further comprising determining the zero position using a middle point between the position detection value obtained at a timing when a polarity of the torque command value is inverted in a going path and the position detection value obtained when the polarity of the torque command value is inverted in a returning path.

5. The inertia estimating method according to claim 1, wherein
    the step of determining the acceleration/deceleration condition includes determining both the acceleration driving condition and the deceleration driving condition such that the magnitude of the cumulative value of the gravity torque or the acceleration is changed in line symmetry about the zero position,
    the step of calculating the inertia includes monitoring the torque command value and the acceleration detection value when the motor is driven according to the determined acceleration driving condition and the determined deceleration driving condition, and
    utilizing an average value of a ratio between the cumulative value of the torque command value and the cumulative value of the acceleration detection value during the acceleration driving condition, and a ratio between the cumulative value of the torque command value and the cumulative value of the acceleration detection value during the deceleration driving condition.

6. The inertia estimating method according to claim 1, wherein the step of determining the acceleration/deceleration condition includes determining both the acceleration driving condition and the deceleration driving condition such that the magnitude of the cumulative value of the gravity torque or the acceleration is changed in line symmetry about the zero position, the step of calculating the inertia includes monitoring the torque command value and the acceleration detection value when the motor is driven according to the determined acceleration driving condition and the determined deceleration driving condition, and utilizing a ratio between an added value of the cumulative value of the torque command value during the acceleration driving condition and the deceleration driving condition, respectively, and an added value of the cumulative value of the acceleration detection value during the acceleration driving condition and the deceleration driving condition, respectively.

7. An inertia estimating apparatus configured to estimate an inertia of a movable portion including a motor and a driven portion connected to the motor and mounted on an apparatus that drives the motor according to a torque command value, the torque command value determined from a position command value and a position detection value of the motor or the driven portion connected to the motor, comprising:

an acceleration/deceleration condition determining unit configured to determine, when the movable portion is driven, one or more of an acceleration driving condition or a deceleration driving condition, such that a cumulative value of a gravity torque or acceleration of the movable portion has a symmetric characteristic about a zero position where the gravity torque that cancels an influence of gravity is zero;

a position command value calculating unit configured to calculate the position command value for driving the motor according to said one or more of an acceleration driving condition or an deceleration driving condition determined by the acceleration/deceleration condition determining unit;

a controller configured to drive the motor based on the position command value calculated by the position command value calculating unit; and an inertia calculating unit configured to receive a torque command value generated by a velocity controller when the motor is driven according to one or more of the acceleration driving condition or the deceleration driving condition, and to obtain an acceleration detection value of the motor or the driven portion, and to calculate the inertia of the movable portion using a ratio between a cumulative value of the torque command value and a cumulative value of the acceleration detection value.

8. An apparatus as defined in claim 7, further including a position detector configured to detect a position of the motor or the driven portion.

9. A method as defined in claim 1, wherein the apparatus that drives the motor is a machine tool with a feed axis, and the method further comprises determining parameters, based on the calculated inertia, for driving the feed axis according to a desired position and velocity, and driving the feed axis according to the desired position and velocity.

10. A method as defined in claim 1, further comprising controlling one or more of a velocity or a position of one or more of the motor or the driven portion using the calculated inertia.

11. An apparatus comprising:

a movable portion including
a motor; and
a driven portion connected to the motor,
wherein the motor is configured to drive the driven portion;

an acceleration/deceleration condition determining unit configured to determine, when the movable portion is driven, one or more of an acceleration driving condition or a deceleration driving condition, such that a cumulative value of a gravity torque or acceleration of the movable portion has a symmetric characteristic about a zero position where the gravity torque that cancels an influence of gravity is zero;

a position command calculator configured to generate a position command value for driving the motor according to said one or more of an acceleration driving condition or an deceleration driving condition;

an inertia calculating unit configured to receive a torque command value generated by a velocity controller from the position command value and a position detection value of the motor or the driven portion when the motor is driven according to one or more of the acceleration driving condition or the deceleration driving condition, obtain an acceleration detection value of the motor, and calculate an inertia of the movable portion using a ratio between a cumulative value of the torque command value and a cumulative value of the acceleration detection value; and a controller configured to drive the motor based on the position command value.

12. An apparatus as defined in claim 11, further including a position detector configured to detect a position of the motor or the driven portion.

* * * * *

UNITED STATES PATENT AND TRADEMARK OFFICE
CERTIFICATE OF CORRECTION

PATENT NO.        : 9,952,249 B2
APPLICATION NO.   : 14/262371
DATED             : April 24, 2018
INVENTOR(S)       : Masashi Miyaji Page 1 of 1

It is certified that error appears in the above-identified patent and that said Letters Patent is hereby corrected as shown below:

On the Title Page

Item (54) and in the Specification, Column 1, Lines 1-3:
"INERTIA ESTIMATING METHOD AND INERTIA ESTIMATION APPARATUS OF POSITION CONTROL APPARATUS" should be changed to --INERTIA ESTIMATING METHOD AND INERTIA ESTIMATING APPARATUS OF POSITION CONTROL APPARATUS--.

Signed and Sealed this
Twenty-fourth Day of July, 2018

Andrei Iancu
*Director of the United States Patent and Trademark Office*